US011966988B2

(12) United States Patent
Lakhani et al.

(10) Patent No.: US 11,966,988 B2
(45) Date of Patent: Apr. 23, 2024

(54) METHOD AND SYSTEM FOR MONITORING A SET-UP FOR MANUFACTURE OF A BIOPHARMACEUTICAL PRODUCT

(71) Applicant: Global Life Sciences Solutions USA LLC, Marlborough, MA (US)

(72) Inventors: Hanish Lakhani, Bengaluru (IN); Nishu Garg, Bengaluru (IN); Hemalatha J, Bengaluru (IN)

(73) Assignee: GLOBAL LIFE SCIENCES SOLUTIONS USA LLC, Marlborough, MA (US)

( * ) Notice: Subject to any disclaimer, the term of this patent is extended or adjusted under 35 U.S.C. 154(b) by 361 days.

(21) Appl. No.: 17/292,203

(22) PCT Filed: Nov. 12, 2019

(86) PCT No.: PCT/EP2019/081054
§ 371 (c)(1),
(2) Date: May 7, 2021

(87) PCT Pub. No.: WO2020/099424
PCT Pub. Date: May 22, 2020

(65) Prior Publication Data
US 2021/0390320 A1 Dec. 16, 2021

(30) Foreign Application Priority Data
Nov. 15, 2018 (IN) ............................. 201841043018

(51) Int. Cl.
*G06T 7/00* (2017.01)
*G06F 18/2431* (2023.01)
(Continued)

(52) U.S. Cl.
CPC ......... *G06Q 50/04* (2013.01); *G06F 18/2431* (2023.01); *G06T 3/4053* (2013.01);
(Continued)

(58) Field of Classification Search
CPC ..... G06Q 50/04; G06F 18/2431; G06F 18/24; G06T 3/4053; G06T 7/001;
(Continued)

(56) References Cited

U.S. PATENT DOCUMENTS 9,591,273 B1 * 3/2017 Wu .......................... G06T 7/001
10,083,378 B2   9/2018 Chakraborty
(Continued)

FOREIGN PATENT DOCUMENTS

JP     2010067247 A     3/2010
JP     2011070562 A     4/2011
(Continued)

OTHER PUBLICATIONS

PCT International Search Report and Written Opinion for PCT/EP2019/081054 dated Feb. 26, 2020 (10 pages).
(Continued)

*Primary Examiner* — Samir A Ahmed
(74) *Attorney, Agent, or Firm* — Eversheds Sutherland (US) LLP

(57) ABSTRACT

The present disclosure relates to a system and method (10) for monitoring a set-up for manufacture and/or setting up for manufacture and/or tearing down after manufacture of a biopharmaceutical product. The method comprises: processing (S2, S3, S4) at least one image of a scene comprising the set-up for manufacture of the biopharmaceutical product. The processing of the at least one image comprises performing (S2) a first process on the at least one image for classifying first objects in the image, said first objects being devices such as clamps, pumps, valves and/or sensors and/or any other bio processing equipment. The first process comprising identifying, localizing and classifying the first objects in the image. A second process is performed (S3) on the at least one image for identifying and localizing con- (Continued)

nections in the images. The second process comprises classifying each pixel with an associated second object classifier, said second object classifier classifying a second object selected from a group comprising the first objects and connections, segmenting out pixels associated with a connection and identifying connection mappings with the first objects. The method further comprises forming (S4) compiled information comprising information relating to the identified connection mappings obtained from the second process and the first objects as identified by the first process.

15 Claims, 9 Drawing Sheets

(51) Int. Cl.
G06Q 50/04 (2012.01)
G06T 3/4053 (2024.01)
G06V 10/764 (2022.01)
G06V 10/82 (2022.01)
G06V 20/52 (2022.01)

(52) U.S. Cl.
CPC ............ *G06T 7/001* (2013.01); *G06V 10/764* (2022.01); *G06V 10/82* (2022.01); *G06V 20/52* (2022.01); *G06T 2207/20081* (2013.01); *G06T 2207/30108* (2013.01); *G06V 2201/06* (2022.01)

(58) Field of Classification Search
CPC ........... G06T 2207/20081; G06T 2207/30108; G06V 10/764; G06V 10/82; G06V 20/52; G06V 2201/06; Y02P 90/30
See application file for complete search history.

(56) References Cited

U.S. PATENT DOCUMENTS

| | | | |
|---|---|---|---|
| 2010/0034484 A1 | 2/2010 | Kido | |
| 2011/0305376 A1* | 12/2011 | Neff | G16H 40/20 382/128 |
| 2012/0313267 A1 | 12/2012 | Pradel et al. | |

FOREIGN PATENT DOCUMENTS

| | | |
|---|---|---|
| JP | 2015082218 A | 4/2015 |
| JP | 2016536122 A | 11/2016 |
| JP | 2017005383 A | 1/2017 |
| JP | 2017122989 A | 7/2017 |
| JP | 2019523425 A | 8/2019 |
| JP | 2022528482 A | 6/2022 |
| WO | 2015065647 A1 | 5/2015 |
| WO | 2017196821 A1 | 11/2017 |
| WO | 2020039104 A1 | 2/2020 |

OTHER PUBLICATIONS

Malamas et al., "A Survey on Industrial Vision Systems, Applications and Tools," Image and Vision Computing, 2003, 21:171-188.
Office Action issued in corresponding Japan application No. 2021-526632, issued Sep. 25, 2023 (6 pages).
Office Action issued in corresponding Japan application No. 2021-533647, issued Oct. 16, 2023 (13 pages).

* cited by examiner

METHOD AND SYSTEM FOR MONITORING A SET-UP FOR MANUFACTURE OF A BIOPHARMACEUTICAL PRODUCT

CROSS REFERENCE TO RELATED APPLICATIONS

This application claims the priority benefit of PCT/EP2019/081054, filed on Nov. 12, 2019, which claims the benefit of Indian Application No. 201841043018, filed on Nov. 15, 2018, the entire contents of which are incorporated by reference herein.

TECHNICAL FIELD

The present disclosure relates to an image/video frame-based method for monitoring a set-up for manufacture of a biopharmaceutical product.

BACKGROUND

The past decade has seen a significant shift in the nature of the products being manufactured and sold by the innovative biopharmaceutical industry. The global biopharmaceutical portfolio of today reflects a greater prevalence of large molecule drugs, expansion in the number of personalized or targeted products, and a rise of treatments for many orphan diseases. These development trends provide for biopharmaceutical products with extremely limited production runs, highly specific manufacturing requirements, and genotype-specific products. The on-going shift in the product mix provides a need for continuous improvement of the efficiency and effectiveness of production biopharmaceutical manufacturing.

Biologic medicines (also called biologics) such as for example therapeutic proteins, monoclonal antibodies, vaccines etc., are complex molecules made by or from living cells. They often require parenteral administration by infusion or injection, thereby requiring highly specialized manufacturing, special storage and handling, and a tightly controlled, high quality manufacturing and distribution network to ensure safety and effectiveness. Developments are also observed with regard to orphan drugs, i.e., drugs aimed at diseases with patient populations of under 200,000, and there has been a steady increase over the past decade. Furthermore, manufacturers are increasingly focusing on more complex diseases for which there are few or no effective treatments. New treatments for these diseases are characterized by small volume products.

Another important trend within biopharmaceuticals is the emergence of personalized medicine; products that target a specific population of patients. Over time, as patient-level personalized medicines are introduced, manufacturing and product supply complexity will likely increase. In general, personalized medicines require related bio-manufacturing processes to be conducted in smaller scale and closer to the patient.

Examples for personalized medicines are gene and cell therapy treatments, such as CAR T cell immunotherapy and regenerative medicine approaches.

The biopharmaceutical products may be intended for therapeutic or diagnostic use, for example. To ensure adequate product quality as well as well controlled and auditable production conditions, cGMP (current Good Manufacturing Practices) and QMS (Quality Management Systems) are typically required and applied. GMP processing environments are designed to conform to the guidelines recommended by agencies that control the authorization and licensing of the manufacture and sale of pharmaceutical products, such as for example the FDA (Food and Drug Administration).

These drug portfolio trends have contributed to an increase in the number and complexity of products being manufactured and sold commercially. In addition, above trends and the rapid market growth of biologic therapies also implies a drastically increasing number of small production batches during drug development before product reach the market, specifically for production of clinical trial material. As the drug development process generally is characterized as a 'development funnel' with a significantly larger number of drug candidates going through clinical trials than the number of successful and eventually approved drugs. Drug substance production during clinical trials, as well as during regular production, requires for high safety and throughput provided by manufacturing systems. However, drug substance production for clinical trials generally requires even higher flexibility in manufacturing methods and systems to adapt to different requirements and production protocols yet complying with rigorous cGMP and QMS requirements. With the background of all biopharma products being subjected to cost pressure, cost reductions during clinical manufacturing and drug development are equally important as for regular production of approved drugs. Cost efficient and safe production systems providing high throughput therefore need to accommodate frequent process changes, process and equipment reconfigurations and other modifications. Additionally, some of the new medicines have increased the need for more complex manufacturing processes, and more advanced equipment. Continuous and connected processing regimes are becoming additions or alternatives to traditional batch manufacturing methods and may have advantages in terms of overall product and/or process quality, efficiency and throughput or cost.

Overall, these drug portfolio trends indicate that there is a need for improved manufacturing creating flexibility with uncompromised quality, while creating operating efficiencies that can help reduce costs. One recent technological development to reduce production cost, increase production throughput and quality as well as reduce safety concerns is the use of single-use technology (SUT) for processing. With single-use technology equipment, wetted parts that are in contact with the process fluid and drug product during processing, such as for example fluid storage vessels, tubing, separation equipment etc., are provided as consumables which are to be installed and used for a specific process only and are disposed thereafter. SUT consumables are typically produced, configured and packaged in clean room environments, and pre-sterilized (e.g. by gamma irradiation) prior to use in the bio-manufacturing process. In contrast to using the traditional and fixed installations of stainless-steel tubing and stainless-steel reactors and vessels, SUT equipment and consumables provide great flexibility in adapting to different process scenarios and configurations, simply by re-arranging (movable) equipment, installing and replacing different consumables over processes. For example, a tank bin can be fitted with a clean and/or sterile SUT fluid bag to provide clean and contained enclosure for fluid and its processing. The advantage of using single-use technology (SUT) fluid handling equipment is primarily that cross-contamination in between production batches and campaigns is eliminated when the SUT equipment is used for a single drug product only. The SUT equipment is disposed of after use, which can be after a single run, batch or campaign comprising multiple runs and batches. When providing SUT equipment pre-sterilized or bioburden controlled, initial cleaning and sanitization (for example by contacting the flow path with sodium hydroxide solutions) or sterilization can be avoided. When using the SUT for a single run or batch only, even cleaning post-use may be omitted. With these features, SUT equipment provides improved efficiency, safety and convenience.

Nowadays, SUT equipment is available for the majority of all types of equipment and/or unit operations, among them bioreactors for cell culture or fermentation, buffer bags for liquid storage, tubing and pumps for liquid transfer and filling operations, filters, chromatography columns and related systems for separations. However, the adaption to single-use technology also implies a higher throughput and flow of materials, i.e. SUT consumables, in production processes and facilities compared to traditional manufacturing with fixed stainless-steel installations.

Further, a significant number of additional operational steps and operator interactions (work) is required to handle said material flow as well as to install and removed the single-use consumables prior and after processing, as well as documenting material, material flow and their use in the processing. The frequent change associated with SUT consumables implies that new (fresh) installations of the processing lines are to be used and documented for each drug run, batch or campaign in a manufacturing process. The biopharma industry is rapidly adopting SUT for above mentioned reasons, however, this adaption is also characterized by least some of the following challenges:

Frequent installation of complete fluid paths required

Large number of material to be handled by operator and managed in planning, logistics and documentation Materials (i.e. consumables and commodity articles) are subject to change over processes due to sourcing variability and/or lack of standardization in single-use consumables Many manual interaction steps

SUMMARY

An object of the present disclosure is to provide solutions, which seek to mitigate, alleviate, or eliminate one or more of the above-identified deficiencies in the art and to provide improved biopharmaceutical manufacturing.

Said object has in accordance with the present disclosure been achieved by means of a method for monitoring a set-up for manufacture and/or setting up for manufacture and/or tearing down after manufacture of a biopharmaceutical product. The method comprises processing at least one image of a scene comprising the set-up for manufacture of the biopharmaceutical product, wherein the processing of the at least one image comprises performing a first process on the at least one image for classifying first objects in the image, said first objects being devices such as clamps, pumps, valves and/or sensors and/or Single Use bags and/or any other bio processing equipment, said first process comprising identifying, localizing and classifying the first objects in the image; performing a second process on the at least one image for identifying connections in the images, said second process comprising classifying each pixel with an associated second object classifier, said second object classifier being a classifier for a second object selected from a group comprising the first objects and connections, segmenting out pixels associated with the connections and identifying connection mappings with the first objects. The method further comprises forming compiled information comprising information relating to the identified connection mappings obtained from the second process and the first objects as identified by the first process.

The term manufacture is herein intended to be interpreted broadly and also include process development.

The term image is intended to include also a video frame of a video sequence.

The term biopharmaceutical product comprises any type of biopharmaceutical product including personalized medicines. Examples for personalized medicines are gene and cell therapy treatments, such as CAR T cell immunotherapy and regenerative medicine approaches.

The use of two different processes for identifying and localizing objects within the images, wherein the first process is focused on identifying, localizing and classifying first objects and possibly a status thereof and the second process in focused on identifying connection mappings between the first objects allows for creating flexibility with uncompromised quality, while creating operating efficiencies that can help reduce costs.

Another advantage with this monitoring method is that it is completely non-invasive.

Another advantage with the monitoring method is that the monitoring system is inexpensive.

The connections may comprise flexible connections. The connections may comprise flexible and/or rigid fluid connections. The flexible connections may comprise tubing.

In different embodiments of the invention, the first process the step of identifying, localizing and classifying the first objects in the image comprises running a Deep Learning/AI classifier on the images, wherein the method further comprises a step of enclosing the identified first objects with boundaries.

In different embodiments of the invention, the step of classifying each pixel with an associated second object classifier comprises running the image through a Deep Learning/AI pixel classifier to identify and localize the second objects on pixel level.

Thereby, the processing is field programmable and self-improving with time.

Further, the method is highly scalable for many kinds of workflows.

High value is added with existing infrastructure with regard to flexible work flow setup and also enabling error proofing.

Further, the same algorithm may be used for many customized requirements.

In different embodiments, the compiled information is compared with a correct workflow scheme, or predefined workflow process scheme, to detect any deviations.

The use of the predefined workflow process scheme associated to the specific selected biopharmaceutical product and the comparison with at least a part of tracked user operator interactions with the manufacture system and/or to at least a part of the result of the tracked operator interactions with the manufacture system enables improved manufacturing creating flexibility with uncompromised quality, while creating operating efficiencies that can help reduce costs. The quality is herein applied to a plurality of or all parts of the process, such as verification before installation, i.e. verification of a so-called Bill Of Material, BOM, comprising material needed for accomplishing an installation set-up, installation of an installation set-up, the installation procedure, approval/verification of the installation set-up and installation procedure, processing itself, and teardown of the installation set-up.

All parts above may be comprised in the predefined workflow process scheme above. Verification and documentation may be obtained. Thus, the predefined workflow process scheme comprises at least the data of a traditional batch protocol, but it may further comprise other processes, i.e. an extended batch protocol as is apparent from the above. The predetermined workflow process scheme may also comprise the data of batch records, thus, data relating to approval and verification of the batch protocol/extended batch protocol.

Thus, the terms 'Batch record' (BR, eBR—electronic Batch Record) as well as Batch protocol are equivalent to "predefined workflow process scheme" The protocol is the instruction and the record is the completed protocol as documentation and result of an executed process.

In this embodiment, the monitoring method may support (and/or refine) electronic protocols and records, thereby allowing the processor to communicate and be effective in its flexibility, agility, adaptability and learning capability.

A deviation from an installation set-up as indicated by the predetermined scheme may be detected. The installation set-up may comprise the verification before installation (verification of so-called Bill Of Material) and/or installation of the installation set-up and/or teardown of the installation set-up. Deviations from the installation set-up adversely affecting the final biopharmaceutical product may lead to a determination that the manufacture system is not correctly set up.

Further, a deviation from the installation procedure as indicated by the predetermined scheme may be detected. Deviations from the installation procedure adversely affecting the final biopharmaceutical product may lead to a determination that the manufacture system is not correctly set up.

Further, deviations from the installation set-up and/or installation procedure known to adversely affect the final biopharmaceutical product and other deviations may then be recorded. Characteristics of the final biopharmaceutical product so manufactured may be recorded in association with the recorded deviations. A detailed analysis of the impact of different procedure deviations may then be obtained, which in turn may be used to further improve the installation procedure of the predetermined scheme. Accordingly, deviations in the final biopharmaceutical product so produced may even be decreased with time.

The monitoring system and its way to work with electronic work instructions also allows for providing a certain flexibility in using different external devices (such as consumables) that result in the same functionality of the assembled final system. The monitoring system allows for guiding the operator through this according to the electronic batch protocol. Hereby, flexibility is tackling material sourcing variability; the system can be self-learning and improve instructions and autonomy in electronic verification during change and repetitive use of new configurations.

In different embodiments, the monitoring is performed continuously for tracking any deviations, e.g. single use workflow leakage, break, etc.

Further embodiments of the present invention are defined in the dependent claims.

In addition to the advantages mentioned above, which of course also are applicable to the system and computer program product embodiments, the disclosure provides the advantage of improved process robustness and the possibility for accelerated scale-up to commercial production of biopharmaceutical products. Further advantages include increased flexibility and reduced production lead times.

The present disclosure further relates to a computer program product comprising at least one non-transitory computer readable storage medium having computer-executable program code instructions stored therein, wherein the computer-executable program code instructions comprise program code instructions configured, when executed perform the method as defined above.

The present disclosure further relates to a system for monitoring manufacture of a biopharmaceutical product and/or setting-up for manufacture of said biopharmaceutical product and/or tearing down after manufacture of said biopharmaceutical product, said system comprising at least one image capture device (imaging device) arranged to capture a scene comprising a manufacture system with capability to manufacture a biopharmaceutical product, and a processor connected to said at least one image capture device and arranged to process images captured by said at least one image capture device to track a status of the manufacture system, wherein the processor is arranged to perform the method as defined above.

DETAILED DESCRIPTION

Figure 1:
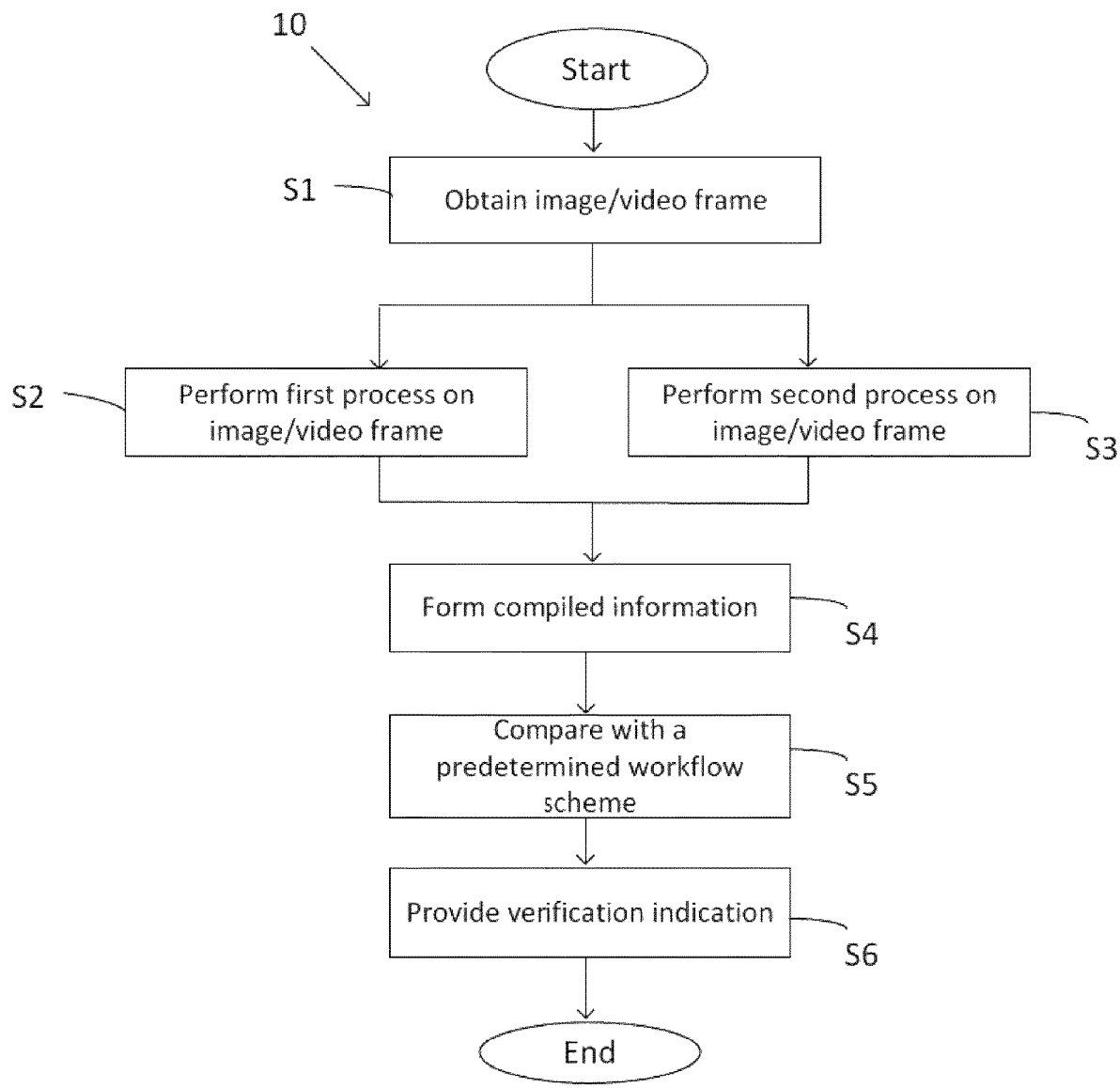
FIG. 1 is a flow chart schematically illustrating an example of a method for monitoring a set-up for manufacture and/or setting up for manufacture and/or tearing down after manufacture of a biopharmaceutical product.

FIG. 1 discloses an example of a method 10 for monitoring a set-up for manufacture and/or setting up for manufacture and/or tearing down after manufacture of a biopharmaceutical product.

The method comprises a step of obtaining S1 one or a plurality of images for use in monitoring the set-up for manufacture and/or setting up for manufacture and/or tearing down after manufacture of a biopharmaceutical product.

The obtained images may comprise images captured at predetermined timings or at predetermined time intervals. The obtained images may comprise video frames.

The obtained images may comprise images captured within the visual field. The obtained images may comprise thermal images. The obtained images may comprise three-dimensional images.

When it comes to manufacture of biopharmaceutical products, the process is important to the final biopharmaceutical product, both with regard to the processing setup in terms of type, configuration and installation of the manufacture system and with regard to detailed processing regimes in terms of operating parameters. Therefore, the installation procedure for setting up for manufacture may have an impact on the final biopharmaceutical product, as wrong or incomplete installations may cause fluid leakage, malfunction or alteration of processing steps and their outcome. Regulatory and/or legal requirements for production of biopharmaceuticals, such as approval by the FDA (food and drug administration), require rigorous control and documentation of set-up, installation, and use of equipment, for example with regard to operator interaction and automated process control. Operating procedures, such as batch protocols, and records, such as batch records, are a fundamental concept in development and production of biopharmaceuticals including approval and monitoring from regulatory bodies. The obtained images are useful among others in monitoring set-up of an installation for manufacture as well as procedures for setting up the installation for manufacture.

The method comprises steps of processing S2, S3, S4 obtained images of a scene comprising the set-up for manufacture of the biopharmaceutical product.

The processing of the obtained images comprises performing S2 a first process on the at least one image for identifying, localizing and classifying first objects in the image. The first objects are devices such as clamps, pumps, valves and/or sensors and/or Single Use bags and/or any other bio processing equipment. The first process identifies and classifies the first objects in the obtained images based on the contents in the images.

The first process may comprise running a first Deep Learning/AI classifier on the images. The first Deep Learning/AI classifier may be a trained classifier trained to identify, localize and classify the first objects in the images. The trained classifier is in one example an artificial neural network such as a convolutional neural network, CNN.

The processing of the obtained images comprises performing S3 a second process on the at least one image for identifying and localizing connections in the images. The second process involves classifying each pixel in the respective obtained image and to associate second object classifications to those pixels identified as forming part of a second object in the image. The second objects comprise connections and the first objects as also identified by the first process. Thus, the second process classifies the second objects. The second object classification associated to the respective pixel is selected from a group comprising the first objects and connections. Further, the second process identifies connection mappings with the first objects.

At least some of the connections connect the first objects to each other and/or to other equipment. The connections may comprise flexible connections. The connections may comprise flexible and/or rigid fluid connections. The flexible connections may comprise tubing.

The second process may comprise running a second Deep Learning/AI classifier on the images to classify the respective pixel in the images. The second classifier may be a trained classifier trained to identify, localize and classify the second objects in the images. The trained classifier is in one example an artificial neural network such as a convolutional neural network, CNN.

The method further comprises a step of forming S4 compiled information comprising information relating to the identified connection mapping obtained from the second process and information relating to the first objects as identified by the first process. The step of forming S4 compiled information may comprise integrating the connection mapping obtained from the second process and the first objects as identified by the first process in the same image to obtain a display illustrating a status of the set-up for manufacture.

The formed compiled information comprises in one example first objects in the form of displays. The formed compiled information may then comprise data relating to sensors/equipment which are not otherwise monitored. Thus, sensors/equipment data may be obtained by use of a display reading present in the formed compiled information. The display reading may be continuously obtained, and the compiled information updated accordingly. Additionally or instead, the display reading may be used by the system for example for manufacture system control.

The method may further comprise a step of comparing S5 the compiled information with a correct workflow to determine whether the set-up is correctly mounted.

In detail, the comparing of the compiled information with the correct workflow may comprise comparing the compiled information with a predefined workflow process scheme relating to a selected biopharmaceutical product and determine whether at least one pre-set criterion set by the workflow process scheme is fulfilled based on the comparison. Then, a flag may be raised in case of any error.

The predetermined workflow process scheme may define correct connection mappings with first objects and pre-set criteria to be fulfilled by the respective first and objects and possibly connections for being correctly mounted.

In particular, compiled information comprising display readings may be compared with a correct workflow to determine whether the set-up is correctly mounted. Thus, also display readings as discussed above may be used in determining whether at least one pre-set criterion set by the workflow process scheme is fulfilled based on the comparison.

The method may further comprise a step for providing S6 an indication that the process is verified for those tube mappings with first objects determined to fulfil the at least one pre-set criterion set by the workflow process scheme and/or those mounting of first objects determined to fulfil the at least one pre-set criterion set by the workflow process scheme. The verification may be performed using a second source of information, such as visual inspection, sensor data from other sensors etc.

The formed compiled information may be stored together with the verification. Images used in the process may also be stored with the verification as part of process documentation.

For the images where the result of the comparison cannot be verified, those images may be saved for use in future training of the classifier.

The monitoring method is adapted for monitoring a set-up for manufacture and/or setting up for manufacture and/or tearing down after manufacture of a variety of biopharmaceutical products. The monitoring method is adapted for monitoring small-volume runs, which require frequent changeovers and may necessitate equipment reconfigurations and updates.

Further, as stated above, the method is adapted for monitoring manufacture using manufacturing processes with increased complexity and/or more advanced equipment may be used.

The use of two different processes for identifying and localizing objects within the images, wherein the first process is focused on identifying, localizing and classifying first objects and possibly a status thereof and the second process in focused on identifying and localizing connection mappings between the first objects allows for creating flexibility with uncompromised quality, while creating operating efficiencies that can help reduce costs.

As is clear from the above, it is also possible to automatically integrate images as part of process documentation for future references and investigations for example when manual errors have been undetected in the process.

As is also clear from the above, errors in classifications may be used as training data points for future improvement with further augmentation. The processes allow users to train based on their specific equipment and use them in workflows.

Figure 2:
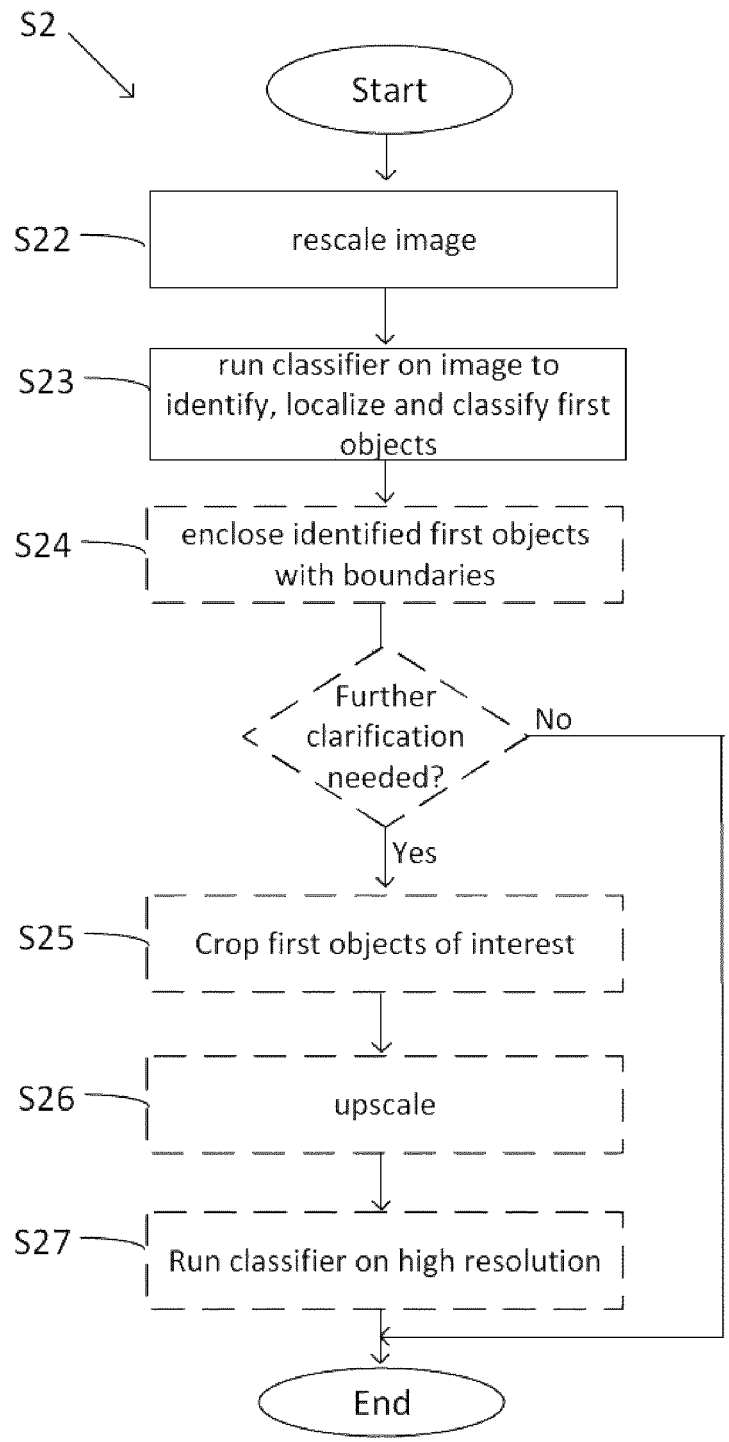
FIG. 2 is a flow chart schematically illustrating an example of a first process of the method of FIG. 1.

In FIG. 2, performing S2 of a first process on the at least one image for classifying first objects in the image, is illustrated. The first process forms part of a method for monitoring a set-up for manufacture and/or setting up for manufacture and/or tearing down after manufacture of a biopharmaceutical product, having at least some characteristics as disclosed in relation to FIG. 1.

The first objects are devices such as clamps and/or pumps and/or valves and/or sensors and/or Single Use bags and/or any other bio processing equipment belonging to a biopharmaceutical manufacture system for manufacture of a biopharmaceutical product.

The first process comprises rescaling S22 the image to low resolution before identifying, localizing and classifying first objects. The rescaling may be performed before or after extraction of regions of the image.

The first process comprises identifying, localizing and classifying S23, S24, S27 the first objects in the image. In the first process, the step(s) of identifying, localizing and classifying S23, S27 the first objects in the image may comprise running a Deep Learning/AI classifier on the images.

The identifying, localization and classifying S23, S24, S27 the first objects in the image may comprise a step of enclosing S24 the identified first objects with boundaries.

After identification, localization and classification of the first objects, it may be determined that the identified and classified objects need further classification.

The first objects of interest of the image may then be cropped S25 based on the enclosed boundaries.

The method may then comprise the steps of upscaling S26 the resolution of interesting first objects and running S27 the classifier on the high-resolution images to extract further details.

The determination whether the identified and classified first objects need further classification may be determined based on any of the following:
- a probability that the first objects have been correctly identified and/or classified.
- a probability that it is possible to determine a status of the first objects based on the enclosed image parts.
- a probability that it is possible to determine whether a pre-set criterion set by the workflow process scheme is fulfilled based on the enclosed image parts.

First objects requiring more details comprise for example clamps, wherein a status of the clamp may be required.

The determination whether the identified and classified first objects need further classification and subsequent upscaling may be performed in multiple steps. Thus, multiple levels of upscaling may be obtained.

For example, upscaling may be performed to a level where first objects in the form of displays may be read. This allows for obtaining data relating to sensors/equipment which are not otherwise monitored. Thus, sensors/equipment data may be obtained by use of a display reading. The display reading may be continuously obtained.

For the images where identification and classification is incorrect, or where it is a low probability that the identification and classification is correct, those images may for example be used for self-learning. The self-learning may relate to continuous improvement of monitoring a set-up for manufacture and/or setting up for manufacture and/or tearing down after manufacture of a biopharmaceutical product. For example, the self-learning may be fed with more data with respect to camera views and/or camera resolution and/or camera type.

Additional/more than one image capturing infrastructure may be deployed to make monitoring system more robust e.g. 3D camera, thermal camera etc. These features can be inbuilt in one imaging device or separate imaging device may be installed.

For the images where it has been identified that identified and classified first objects need further classification, those images may be saved for use in future training of the classifier.

For the images where it has been identified that even for the upscaled image parts, the identified and classified first objects need further classification, those images may be saved separately for use in future training of the classifier and/or for improvement in how the images are obtained.

Figure 3:
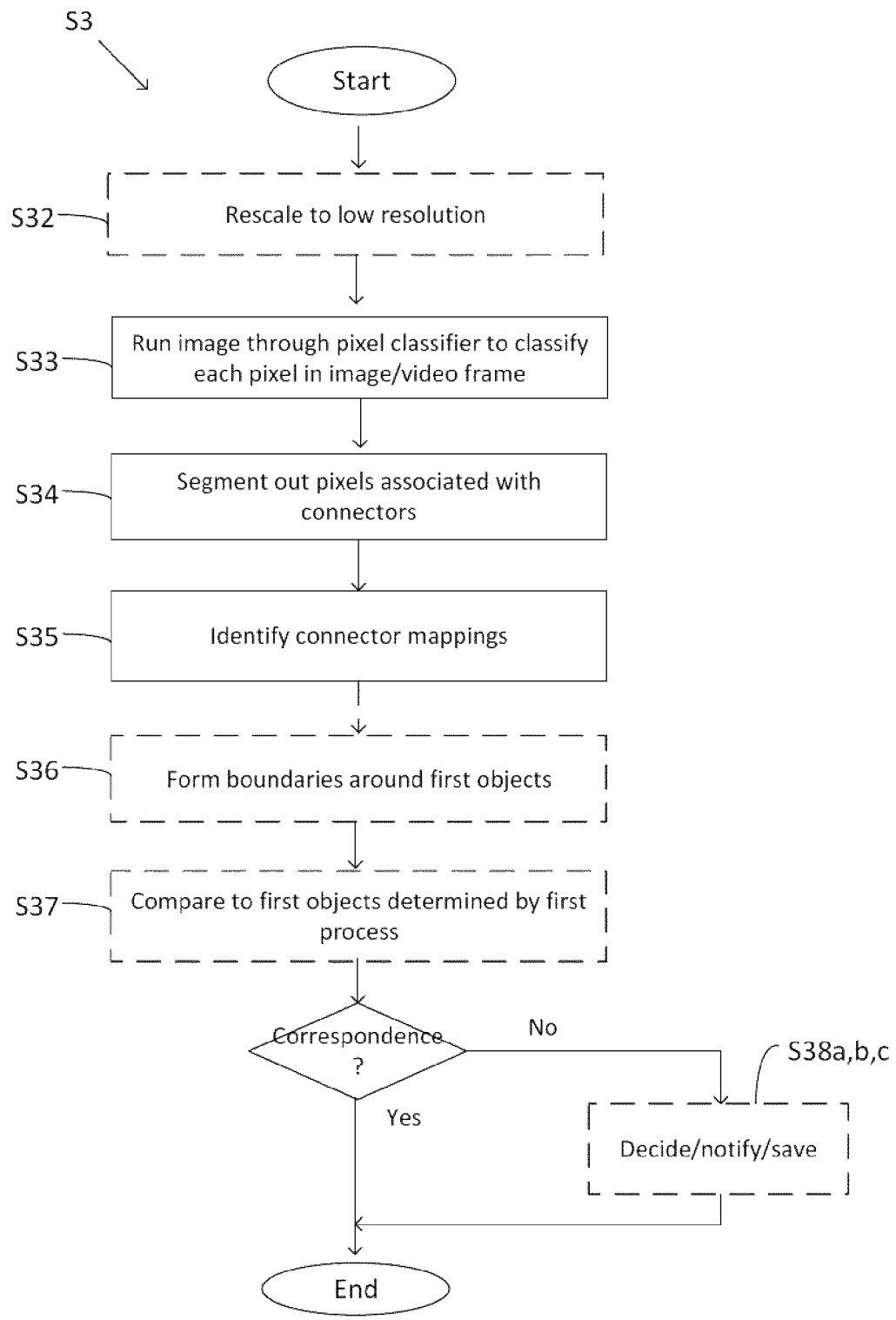
FIG. 3 is a flow chart schematically illustrating an example of a second process of the method of FIG. 1.

In FIG. 3, performing S3 of a second process on the at least one image for classifying second objects in the image, is illustrated. The second process forms part of a method for monitoring a set-up for manufacture and/or setting up for manufacture and/or tearing down after manufacture of a biopharmaceutical product, having at least some characteristics as disclosed in relation to FIG. 1.

The second objects comprise the first objects identified for example by the first process as discussed in relation to FIG. 2. The second objects further comprise connectors.

The second process S3 may comprise a step of rescaling S32 the image to low resolution before each pixel of the image is classified with the associated second object classifier.

The second process comprises-classifying S33 each pixel with an associated second object classifier. The step of classifying S33 each pixel with an associated second object classifier may comprise running the image through a Deep Learning/AI pixel classifier to identify and localize the second objects on pixel level.

The second process may further comprise segmenting out S34 pixels associated with connections.

The second process may further comprise identifying S35 connector mappings.

The second process S3 may further comprise forming boundaries S36 around the first objects The second process S3 may further comprise determining S37 whether the first objects classified by the second process correspond to those classified by the first process (as discussed in relation to FIG. 2). When boundaries S36 have been formed around the first objects in the first and/or second process, the determination S37 whether the first objects classified by the second process correspond to those classified by the first process may be made based on the image parts within said boundaries.

When it is determined that at least one of the first objects classified by the second process do not correspond to a classification made by the first process, the following steps may be performed:
  decide S38a about a classification based on a probability and/or notify S38b user for intervention and/or store S38c the image for use in future self-learning for example using AI and/or training of classifier for example using AI.

Figure 4:
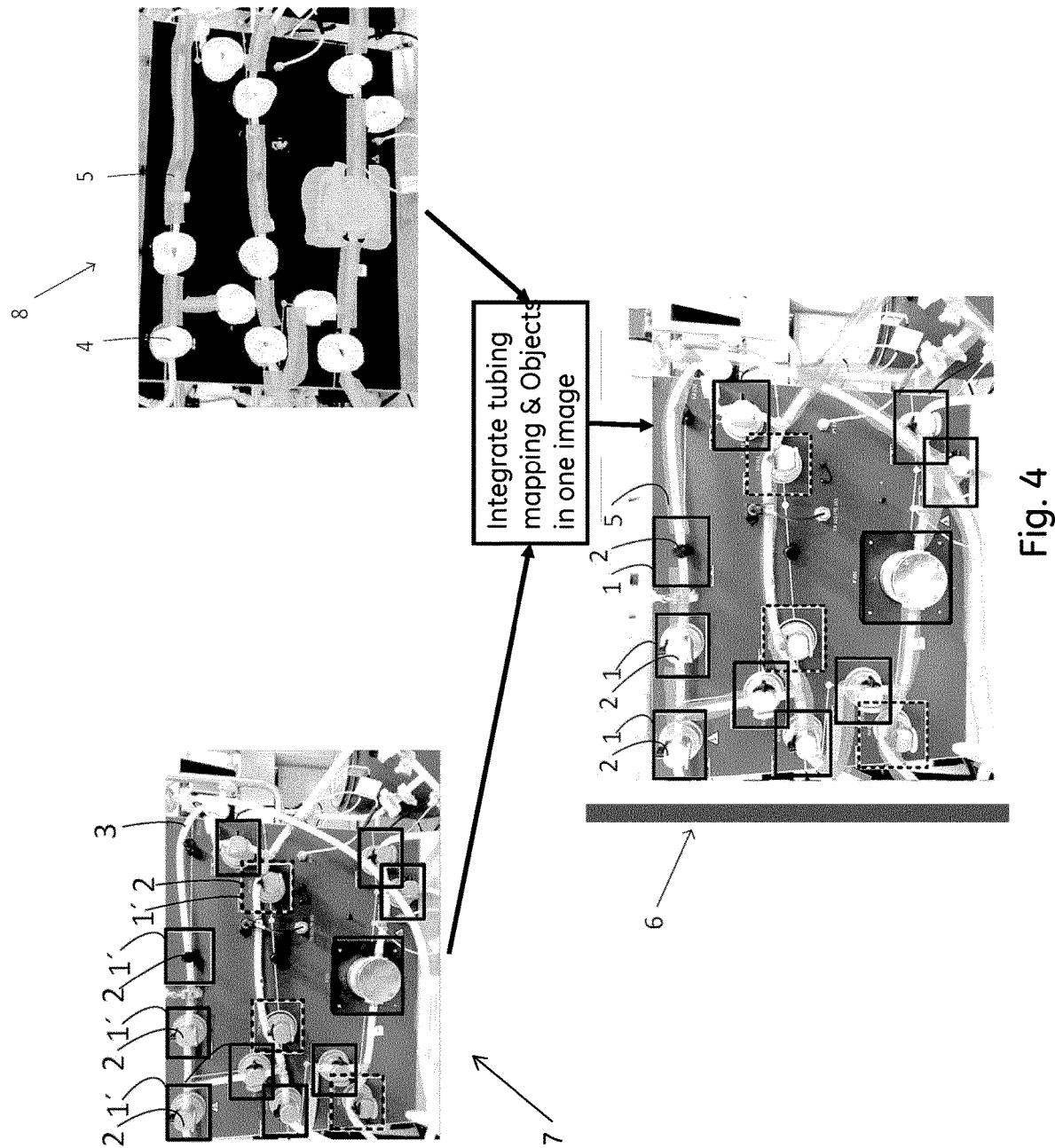
FIG. 4 is an example illustrating formed compiled information.

In FIG. 4, an example of formed compiled information is illustrated. The formed compiled information comprises information relating to the identified connection mapping 5 obtained from the second process and the first objects 2 as identified by the first process.

The formed compiled information has been formed based on a first augmented image 7 of a manufacture system. The first augmented image 7 is formed based on the first process as disclosed in relation to FIG. 2. The first augmented image 7 comprises first objects 2 and connections 3. The first image is augmented with boundaries 1' around the first objects 2.

The formed compiled information has further been formed based on a second augmented image 8 of the manufacture system. The second augmented image is formed based on the second process as disclosed in relation to FIG. 3. The second augmented image comprises the identified connection mapping 5 obtained from the second process and indications 4 of the first objects as identified and classed in the second process. The second augmented image is not necessarily an augmented actual capture image. The second augmented image may be any representation of the identified connection mapping 5 and indications 4 of the first objects.

In the example of FIG. 4, formed compiled information is represented as a compiled augmented image 6. In the compiled augmented image 6, the first objects are disclosed marked by means of boundaries 1. The boundaries may coincide with the boundaries 1' as formed in the first process as disclosed in relation to FIG. 2.

In the compiled augmented image 6, the indications 4 of the second augmented image 8 and the first objects 2 of the first augmented image 7 are matched and the connection mapping 5 is correctly positioned in relation to the first objects 2/boundaries 1.

In the illustrated example, the boundaries 1 of the compiled augmented image 6 are represented by solid lines for those first objects 2, which have been correctly mounted in accordance with a predetermined workflow process scheme. The predetermined workflow process scheme may define correct connection mappings with first objects and pre-set criteria to be fulfilled by the respective first and objects and possibly connections for being correctly mounted. In the illustrated example, the boundaries 1 are represented by broken lines for those first objects 2, which have not been correctly mounted in accordance with a predetermined workflow process scheme. Each boundary may further be associated to a probability value. For example, if the first object is a valve, which in accordance with the predetermined workflow scheme should be closed, then when it has been determined that the valve is closed, based on the comparison of the image with the predetermined workflow process scheme, a probability value that the determination is correct may be provided. This probability value may be shown in the compiled augmented image. The probability value may be shown at the location of the valve or at the location of the boundary of the valve. Similarly, if it has been determined that the valve is open even though it should be closed in accordance with the predetermined workflow process scheme, a probability value that this determination is correct may be provided in the same manner. Further, a probability value may also be provided relating to the probability classification of the first object as a valve is correct.

Figure 5:
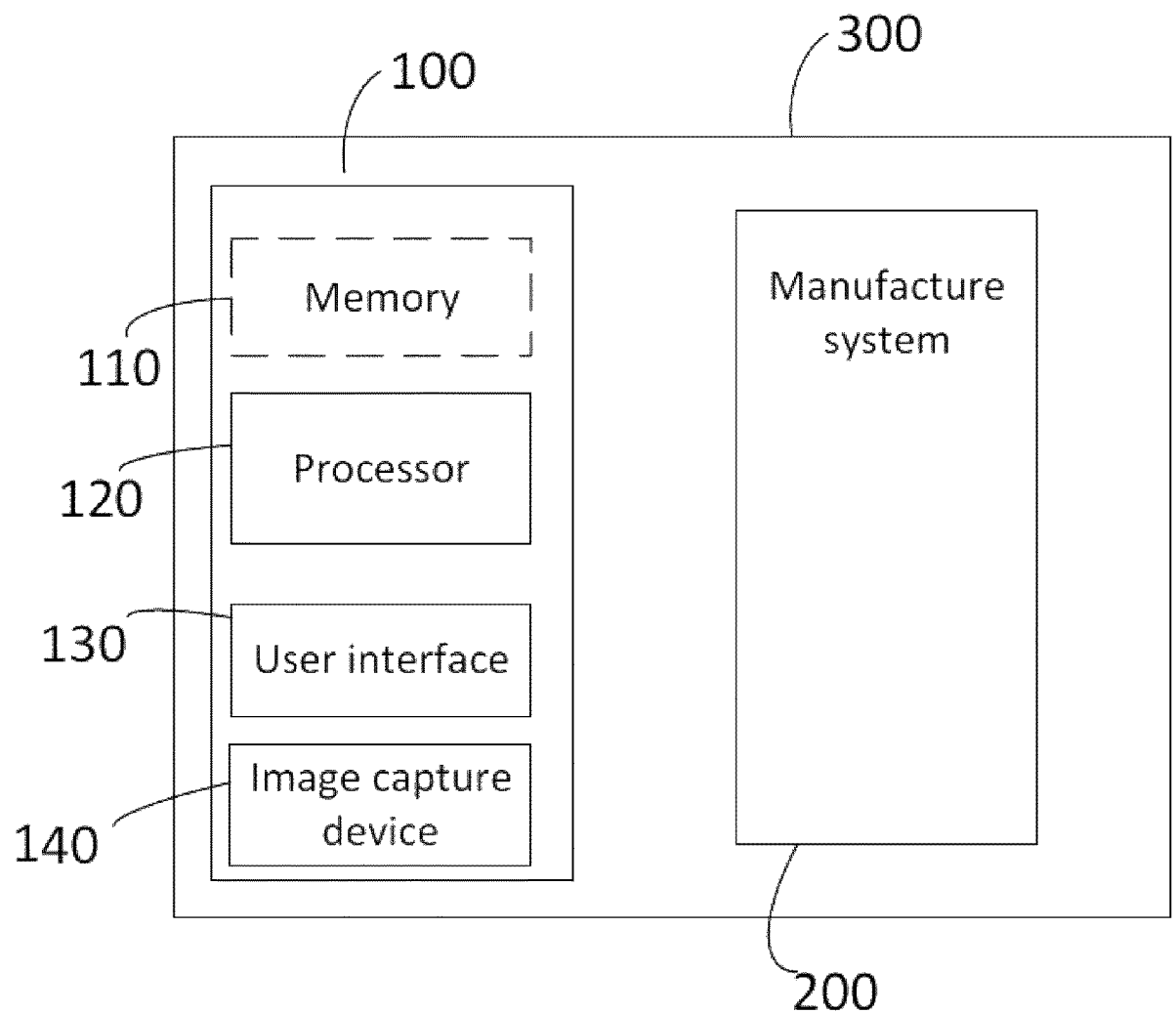
FIG. 5 is a block scheme illustrating an example of a monitoring system for monitoring of a manufacture system.

In FIG. 5, a system 300 is disclosed comprising a monitoring system 100 for monitoring manufacture of a biopharmaceutical product and/or setting-up for manufacture of said biopharmaceutical product and/or tearing down after manufacture of said biopharmaceutical product, is illustrated. The monitoring system 100 may be arranged to monitor a manufacture system 200 with capability to manufacture said biopharmaceutical product.

The monitoring system 100 comprises at least one image capture device 140 arranged to capture a scene comprising the manufacture system 200. The at least one image capture device 120 be at least one camera. The at least one camera may be arranged to record images within the visual field. The at least one camera may comprise a thermal camera. The at least one camera may comprise a three-dimensional camera. The at least one camera may comprise a video camera for example arranged to capture images within the visual field, IR or NIR and/or arranged to take three dimensional images.

The monitoring system 100 comprises further one or a plurality of processors 120 and a memory 110. The processor 120 and/or memory is connected to the at least one camera. The processor is arranged to process images captured by the camera to track a status of the manufacture system 200.

The processor is arranged to process at least one image of the scene comprising the set-up or manufacture system for manufacture of the biopharmaceutical product. The processing of the at least one image comprises performing a first process on the at least one image for classifying first objects in the image, said first objects being devices such as clamps, pumps, valves and/or sensors and/or Single Use bags and/or any other bio processing equipment, said first process comprising identifying, localizing and classifying the first objects in the image. The processing of the at least one image comprises performing a second process on the at least one image (or a copy thereof) for identifying and localizing connections in the images The second process comprises classifying each pixel with an associated second object classifier, said second object classifier being a classifier for a second object selected from a group comprising the first objects and tubing, segmenting out pixels associated with connections and identifying connection mappings with the first objects. The processing further comprises forming compiled information comprising information relating to the identified connection mapping obtained from the second process and the first objects as identified by the first process.

The processor may be arranged to perform processing as exemplified in the description in relation to FIGS. 1, 2 and 3.

Figure 6:
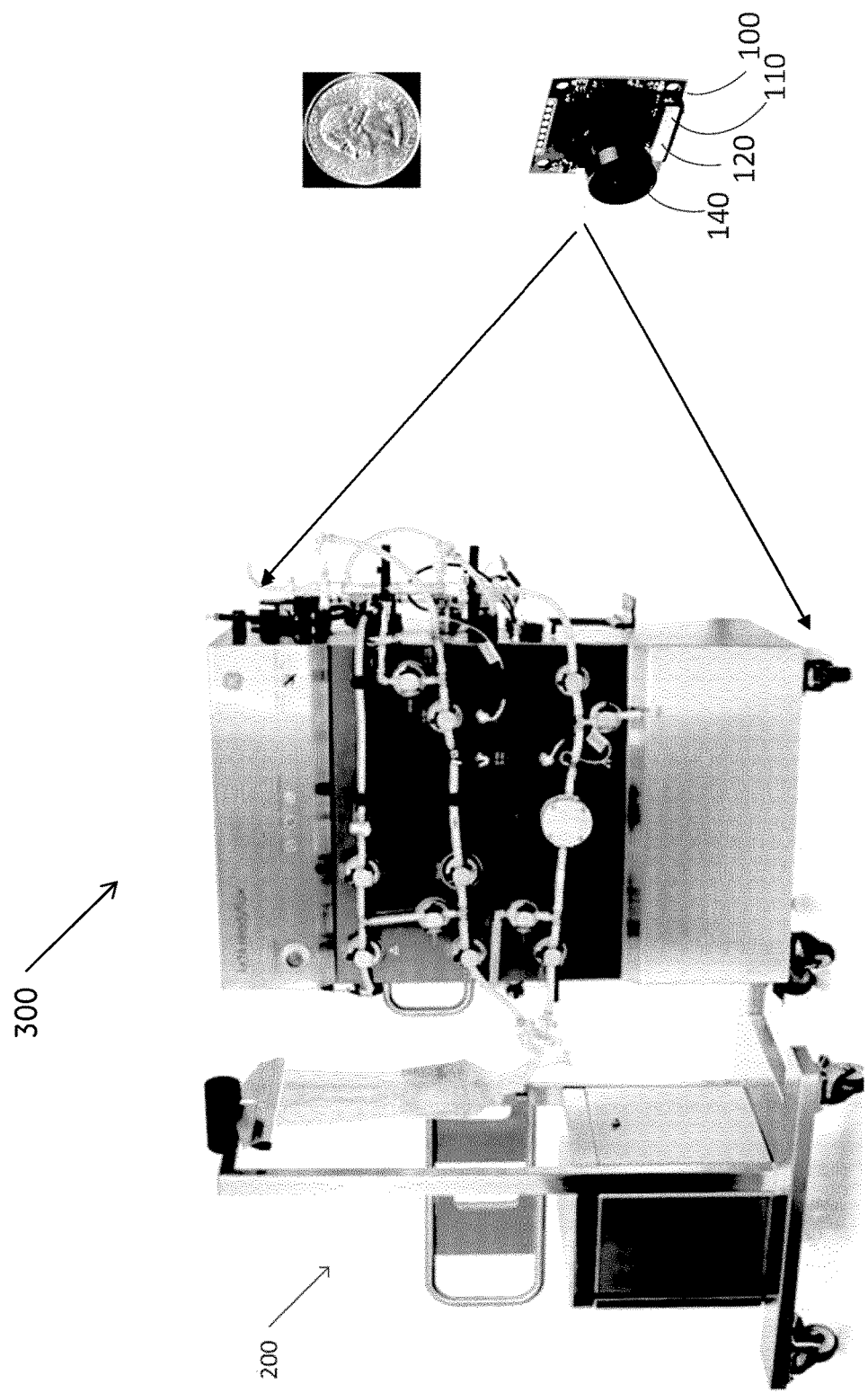
FIG. 6 illustrates an example of a system comprising a manufacture system and a monitoring system.

FIG. 6 illustrates an example of a system 300 comprising a manufacture system 200 and a monitoring system 100. The monitoring system 100 comprises an image capture device 140 and a processor 120 and a memory 110. The monitoring system has a field of view covering parts of the manufacture system having first parts and connections.

The monitoring system 100 may be small sized and therefore easy to fit into an environment containing the manufacture system 200. In the illustrated example, the monitoring system 100 is formed in one unit. This is only an example. The different parts of the monitoring system 100 may be formed at different locations. For example, the image capture device man be placed at one location and the processor and memory at another location. The different devices may then communicate by wirelessly or by wire.

Figure 7:
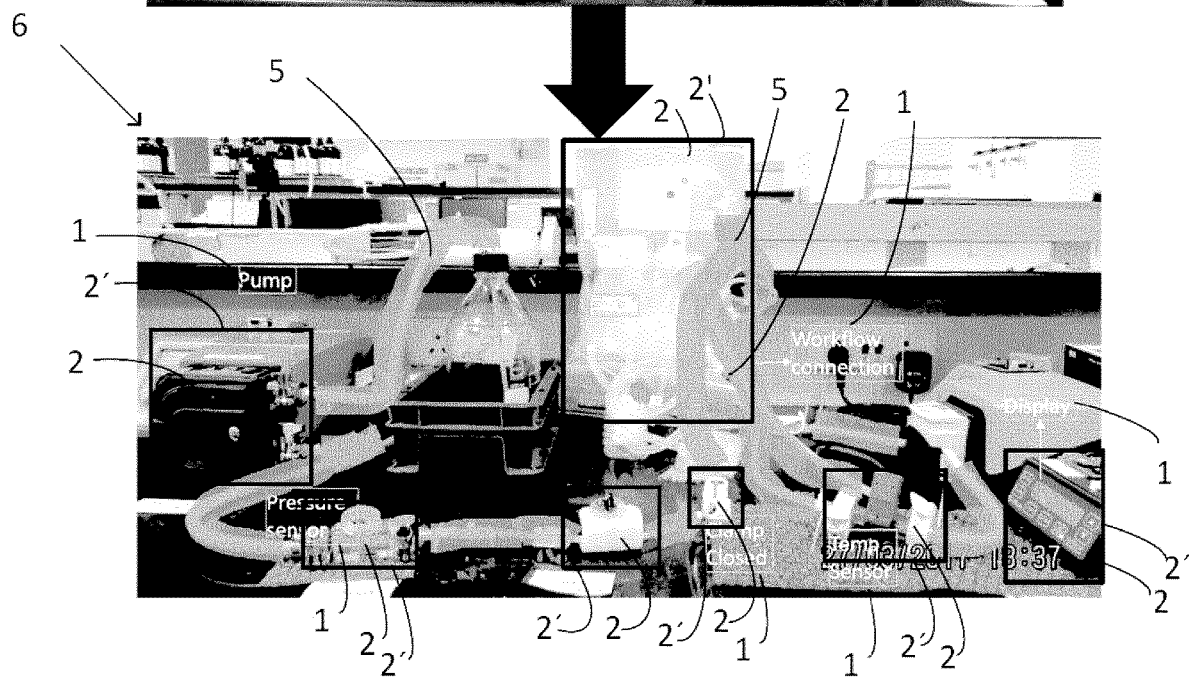
FIG. 7 illustrates another example of a manufacture system and a compiled augmented image provided by use of an example of a monitoring system.

FIG. 7 illustrates an example of use of a monitoring system for monitoring a more flexible manufacture system 200. The upper picture illustrates the manufacture system.

The lower picture illustrates a compiled augmented image 6 formed by the monitoring system.

In the illustrated example, the compiled augmented image 6 comprising information relating to the identified tubing mapping 5 obtained from the second process and the first objects 2 as identified by the first process. The information about the respective first objects 2 as identified by the first process comprises in the illustrated example a mark-up of the first object. The mark-up may be enclosed by means of boundaries 1. The mark-up/boundaries 1 may be positioned at the respective object 2 or adjacent thereto. The mark-up/boundaries should be positioned in relation to the associated first object 2 such that it is clear to which first object the mark-up/boundary 1 is associated. As illustrated in the figure, an arrow may point from the mark-up/boundaries to the associated first object, or vice versa. The mark-up may comprise written information indicating the classification of the first object, such as pump, workflow connection, display, pressure sensor, temperature sensor, clamp. The mark-up may further comprise a status relating to the classified first object, such as clamp closed.

In the illustrated example the first objects 2 are identified by marks 2' which at least partly enclose the first objects 2.

Thus, the monitoring system may support in monitoring the status of very flexible and even not so structured manufacture systems.

This illustrates how monitoring as defined herein, possibly using Artificial intelligence, can be used for error proofing workflows, sensors scalability/addition, flexibility, process optimization and/or continuous monitoring.

Figure 8:
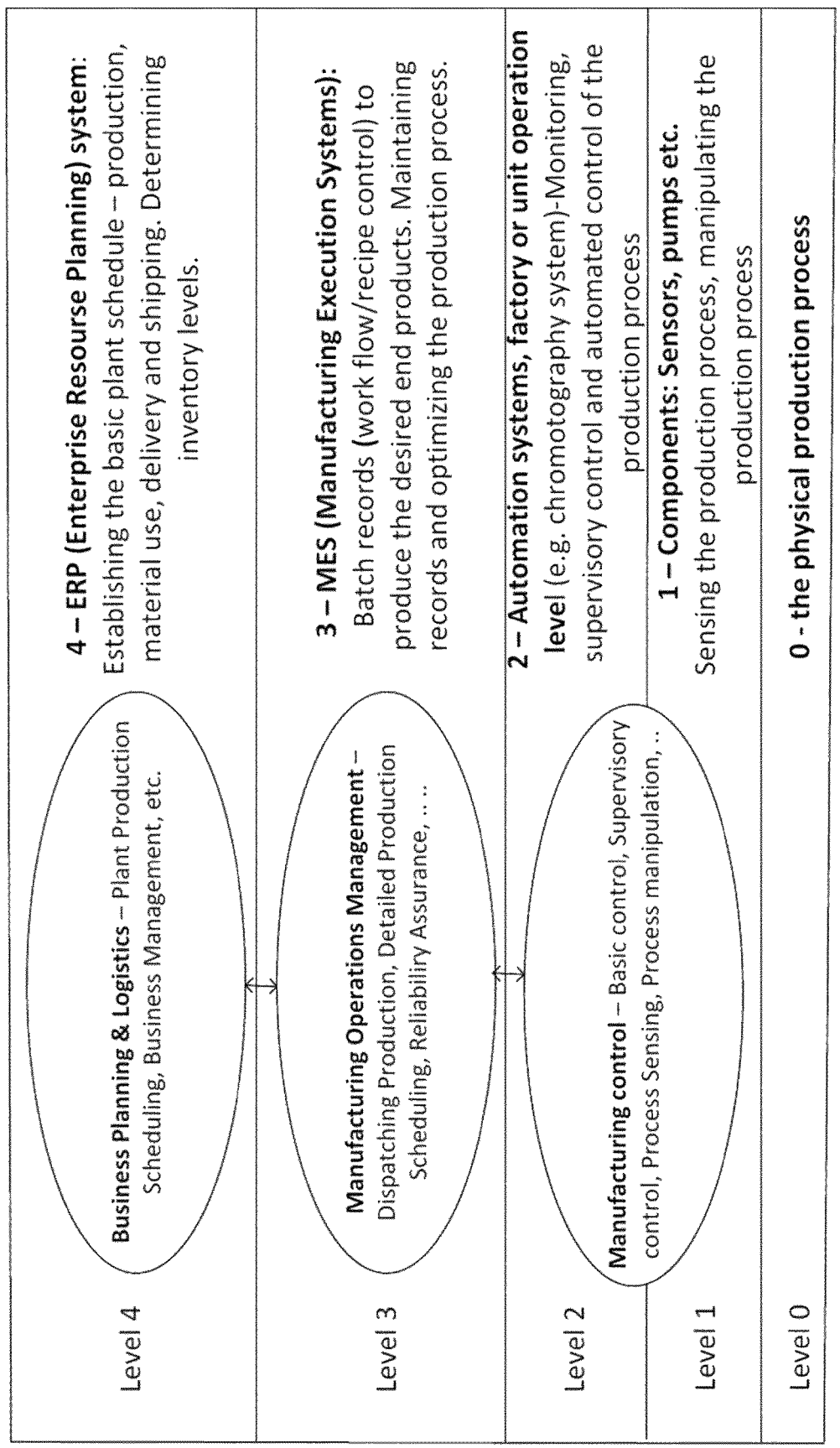
FIG. 8 illustrates a scheme illustrating different levels of providing manufacture support aligned with the ISA95 standard.

FIG. 8 illustrates a scheme illustrating different levels of providing manufacture support aligned with the ISA95 standard. A level 0 illustrates a physical production process. In level 1, the components, such as sensors, pumps etc. of the physical production process are defined. The physical process is sensed by means of sensors and the production process may be manipulated. Level 2 relates to automation systems. Level 2 may be defined as a factory or unit operation level. In level 2, monitoring and supervisory control and automated control of the process is obtained. By implementing levels 1 and 2, manufacturing control is achieved. The manufacturing control involves basic control, supervisory control, process sensing and process manipulation.

Level 3 is a Manufacturing Execution System, MES, level. In the illustrated example, at level 3, batch records are controlled to produce desired end products. The batch records are intended for work flow and/or recipe control. The batch records may be maintained and/or the production process may be optimized. The use of the predetermined workflow process scheme as disclosed herein allows for manufacture support primarily at this level, namely the control, execution and documentation of batch records. To take full advantage of the monitoring system as described herein, batch records are preferably managed electronically and workflow instruction as well as input and feedback to the electronic batch record (eBR), such as by sensors, are transferred electronically. This level 3 may be denoted a level of manufacturing operational management. This level covers dispatching production and/or detailed production scheduling and/or reliability assurance.

However, at least parts of the workflows may be defined at level 2. This will be more discussed in relation to FIG. 9.

Level 4 is an Enterprise Resource Planning, ERP, level. Level 4 is a level for business planning and logistics. This level involves plant production scheduling and business management.

Figure 9:
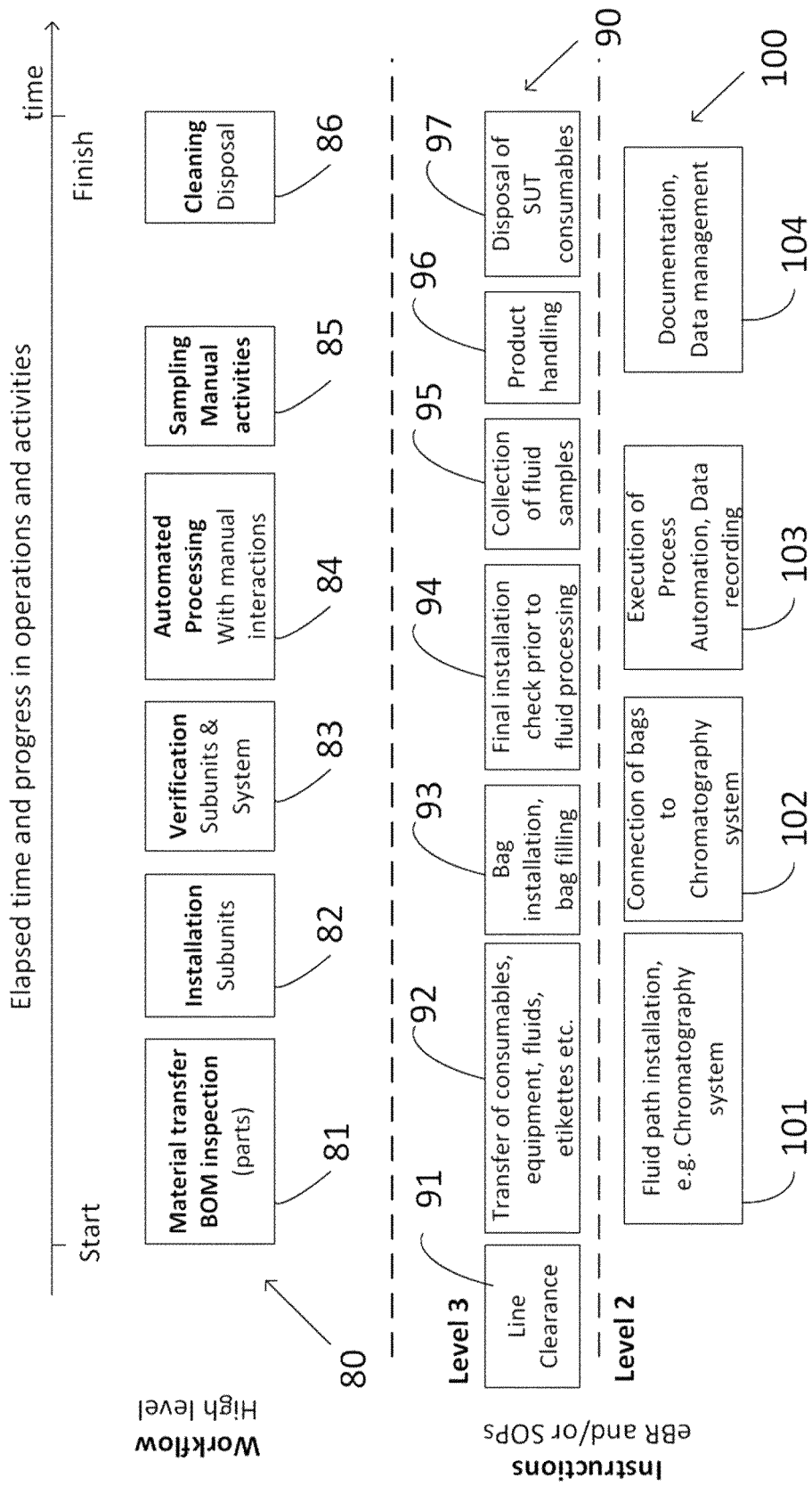
FIG. 9 illustrates an example of a time line over high level work flow operations and activities and instructions associated thereto.

FIG. 9 illustrates an example of a scheme for manufacture of a predetermined biopharmaceutical product.

The scheme comprises in the illustrated example a high-level workflow 80 for the manufacture of the predetermined biopharmaceutical product. In the illustrated example, the high-level work flow 80 starts with material transfer and/or BOM inspection 81. Thereafter, an installation step for installation 83 of the manufacture system is performed. Thereafter, the installation is verified 83. Thereupon, automated processing 84 possibly with manual interactions is performed. Thereafter, a sampling step 85 is performed for sampling manual activities. Thereafter the scene of the manufacture is cleaned 86. In this step, single use products are disposed. Steps may be added and/or removed from this high-level work flow 80.

Further the scheme may comprise instructions 90, 100 for the manufacture of the predetermined biopharmaceutical product. The instructions comprise for example Standard Operation Procedures, SOPs, and/or an electronic batch record, eBR. The instructions may belong to either level 2 or level 3 or a combination thereof in the different levels of providing manufacture support aligned with the ISA95 standard (by ISA, International Society of Automation), as discussed in relation to FIG. 7.

In the illustrated example Level 3 instructions 90 comprise instructions for Line clearance 91. This instruction characteristically precedes or may be considered an initialization of the material transfer and/or BOM inspection 81.

In the illustrated example, the Level 3 instructions comprise further instructions 92 for transfer of consumables, and/or equipment and/or fluids and/or etiquettes. This instruction characteristically belongs to material transfer and/or BOM inspection 81 and/or installation 82.

In the illustrated example, the Level 3 instructions comprise further instructions 93 for bag installation and/or bag filling. This instruction characteristically belongs to installation 82 and/or verification 83.

In the illustrated example, the Level 3 instructions comprise further instructions 94 for final installation prior to fluid processing. This instruction characteristically belongs to verification 83 and/or automated processing 84.

In the illustrated example, the Level 3 instructions comprise further instructions 95 for collection of fluid samples. This instruction characteristically belongs to automated processing 84 and/or sampling manual activities 85.

In the illustrated example, the Level 3 instructions comprise further instructions 96 for product handling. This instruction characteristically belongs to sampling manual activities 85.

In the illustrated example, the Level 3 instructions comprise further instructions 97 for disposal of consumables. The consumables may be of SUT type (Single Use Technology) This instruction characteristically belongs to cleaning 86.

Further, in the illustrated example, Level 2 instructions 100 comprise instructions 101 for fluid path installation, e.g. Chromatography system. This instruction characteristically belongs to material transfer and/or BOM inspection 81 and/or installation 82 and may be called upon or referenced by the Level 3 eBR as a standard operating procedure (SOP), for example defined, executed, documented and maintained by the Chromatography system and its control system or a different workflow management system.

Further, in the illustrated example, Level 2 instructions 100 comprise instructions 102 for connections of bags to chromatography system. This instruction characteristically belongs to installation 82 and/or verification 83. Again, his instruction, its execution and documentation may be called upon or referenced by the Level 3 eBR as a standard operating procedure (SOP).

Further, in the illustrated example, Level 2 instructions 100 comprise instructions 103 for execution of process automation and/or data recording. This instruction characteristically belongs to automated processing 84.

Further, in the illustrated example, Level 2 instructions 100 comprise instructions 104 for documentation and/or data management. This instruction may comprise or be part of manual sampling activities 85 and/or cleaning activities 86.

This scheme for manufacture of a predetermined biopharmaceutical product is as is apparent from the above only an example. High level workflows 80 and/or instructions 90, 100 may be added or removed. The instructions may further be selected to belong to Level 2 or Level 3, whichever is appropriate. Level 2 activities may be considered as SOPs (standard operating procedures) that may be managed by a separate electronic workflow system. This Level 2 workflow management system may provide above mentioned features of instructing, guiding and correcting the operator, documenting the results, providing intelligent sensing, learning and workflow improvement capabilities. Level 2 workflow management systems may be provided by an instrument or system, such as a chromatography system and its control software or by independent stand-alone systems and software.

The monitoring system and method as described herein may be integrated in the infrastructure as disclosed in relation to FIGS. 8 and 9. It would be very simple to integrate the monitoring system/method in such infrastructure.

The classifier and pixel classifier as discussed herein are characteristically mathematical functions performed on the image.

The invention claimed is:

1. A method for monitoring a set-up for manufacture and/or setting up for manufacture and/or tearing down after manufacture of a biopharmaceutical product, said method comprising:
    processing at least one image of a scene comprising the set-up for manufacture of the biopharmaceutical product;
    wherein the processing of the at least one image comprises:
        performing a first process on the at least one image for classifying first objects in the image, said first objects being clamps, pumps, valves and/or sensors and/or Single Use bags and/or any other bio processing equipment, said first process comprising identifying, localizing and classifying the first objects in the image;
        performing a second process on the at least one image for identifying and localizing connections in the images, said second process comprising:
            classifying each pixel with an associated second object classifier, said second object classifier being a classifier for a second object selected from a group comprising the first objects and said connections;
            segmenting out pixels associated with the connections; and
            identifying connection mappings with the first objects; and
        forming compiled information comprising information relating to the identified connection mappings obtained from the second process and the first objects as identified by the first process.

2. The method according to claim 1, wherein the connections comprise at least one flexible connection such as tubing and/or at least one non-flexible connections.

3. The method according to claim 1, wherein in the first process the step of identifying, localizing and classifying the first objects in the image comprises running a Deep Learning/AI classifier on the images, wherein the method further comprises a step of enclosing the identified first objects with local boundaries.

4. The method according to claim 3, wherein the performing of the first process on the at least one image for classifying first objects in the image comprises:
    extracting regions of the image having at least a predetermined probability of comprising one said first object, wherein the step of running the classifier is performed only on the extracted regions to identify, localize and classify the first objects of the extracted regions.

5. The method according to claim 1, wherein the performing of a first process for classifying objects in the images comprises:
    rescaling the image to low resolution before identifying, localizing and classifying first objects; and
    when after identification and classification of the first objects it is determined that the identified and classified objects need further classification;
    cropping first objects of interest of the image based on the enclosed boundaries
    upscaling the resolution; and
    running the classifier on the high-resolution images to extract further details.

6. The method according to claim 1, wherein the step of classifying each pixel with an associated second object classifier comprises running the image through a Deep Learning/AI pixel classifier to identify and localize the second objects on pixel level.

7. The method according to claim 1, wherein the second process further comprises determining whether the first objects classified by the second process correspond to those classified by the first process.

8. The method according to claim 7, wherein the second process further comprises forming boundaries around the first objects before determining whether the first objects classified by the second process correspond to those classified by the first process.

9. The method according to claim 7, wherein when it is determined that at least one of the first objects classified by the second process do not correspond to a classification made by the first process, the following steps are performed:
    decide about a classification based on a probability; and/or
    notify user for intervention; and/or
    store the image for use in future self-learning.

10. The method according to claim 1, wherein the second process further comprising a step of rescaling the image to low resolution before each pixel of the image is classified with the associated second object classifier.

11. The method according to claim 1, wherein the compiled information is compared with a correct workflow scheme to detect any deviations.

12. The method according to claim 1, wherein the step of forming compiled information comprises integrating the connector mapping obtained from the second process and the first objects as identified by the first process in the same image to obtain a display illustrating a status of the set-up for manufacture.

13. The method according to claim 1, wherein the monitoring is performed continuously for tracking any deviations, single use workflow leakage, and/or break.

14. A computer program product comprising at least one non-transitory computer readable storage medium having computer-executable program code instructions stored therein, wherein the computer-executable program code instructions comprise program code instructions configured, when executed perform the method according to claim 1.

15. A system for monitoring manufacture of a biopharmaceutical product and/or setting-up for manufacture of said biopharmaceutical product and/or tearing down after manufacture of said biopharmaceutical product, said system comprising,
- at least one image capture device arranged to capture a scene comprising a manufacture system with capability to manufacture a biopharmaceutical product; and
- a processor connected to said at least one image capture device and arranged to process images captured by said at least one image capture device to track a status of the manufacture system;
- wherein the processor is arranged to perform the method according to claim 1.

* * * * *